(12) United States Patent
Chu et al.

(10) Patent No.: US 7,990,865 B2
(45) Date of Patent: Aug. 2, 2011

(54) COMMUNICATING PROCESSING CAPABILITIES ALONG A COMMUNICATIONS PATH

(75) Inventors: Chung-Cheung Chu, Brossard (CA); Rafi Rabipour, Cote Saint-Luc (CA); Peter Yue, St. Laurent (CA)

(73) Assignee: Genband US LLC, Plano, TX (US)

( * ) Notice: Subject to any disclaimer, the term of this patent is extended or adjusted under 35 U.S.C. 154(b) by 498 days.

(21) Appl. No.: 10/599,088

(22) PCT Filed: Mar. 21, 2005

(86) PCT No.: PCT/IB2005/000730
§ 371 (c)(1), (2), (4) Date: Sep. 19, 2006

(87) PCT Pub. No.: WO2005/089055
PCT Pub. Date: Sep. 29, 2005

(65) Prior Publication Data
US 2008/0240079 A1    Oct. 2, 2008

Related U.S. Application Data

(60) Provisional application No. 60/554,605, filed on Mar. 19, 2004.

(51) Int. Cl.
*G01R 31/08* (2006.01)

(52) U.S. Cl. ........ 370/235; 370/466; 370/392; 370/230; 370/351; 370/352; 709/220; 709/227; 455/446; 455/433; 455/437

(58) Field of Classification Search .................. 370/466, 370/352; 709/227; 455/446, 452
See application file for complete search history.

(56) References Cited

U.S. PATENT DOCUMENTS 3,652,798 A    3/1972 McNeilly et al.
(Continued)

FOREIGN PATENT DOCUMENTS

CA    2336699 A1    1/2000
(Continued)

OTHER PUBLICATIONS

International Search Report for PCT/IB2005/000730, mailed Oct. 3, 2005.
(Continued)

*Primary Examiner* — Curtis Kuntz
*Assistant Examiner* — Phung-Hoang J Nguyen
(74) *Attorney, Agent, or Firm* — Jenkins, Wilson, Taylor & Hunt, P.A.

(57) ABSTRACT

The present invention provides a technique for determining which nodes are to provide various functions on traffic along a particular communication path. Generally, a communication path may include multiple nodes between which and through which traffic is routed. These nodes may include the communication terminals at either end of the communication path, as well as various types of routing nodes along the communication path. Each node will send to other nodes in the communication path information identifying the local functions it is capable of providing to the traffic carried in the communication path, and if available, remote functions capable of being provided to the traffic by other nodes in the communication path. Each node will receive from other nodes in the communication path information bearing on the remote functions. Each node will access criteria to determine whether any local functions should be applied to the traffic.

20 Claims, 6 Drawing Sheets

U.S. PATENT DOCUMENTS

| | | | |
|---|---|---|---|
| 4,048,446 A | 9/1977 | Hafner et al. | |
| 4,455,649 A | 6/1984 | Esteban et al. | |
| 4,545,052 A | 10/1985 | Steierman | |
| 5,295,136 A | 3/1994 | Ashley et al. | |
| 5,375,121 A | 12/1994 | Nishino et al. | |
| 5,612,957 A * | 3/1997 | Gregerson et al. | 370/401 |
| 5,710,976 A | 1/1998 | Hill et al. | |
| 5,740,157 A | 4/1998 | Demiray et al. | |
| 5,905,873 A | 5/1999 | Hartmann et al. | |
| 5,930,264 A * | 7/1999 | Nguyen | 370/466 |
| 5,933,487 A | 8/1999 | Strickland | |
| 5,995,923 A | 11/1999 | Mermelstein et al. | |
| 5,999,529 A | 12/1999 | Bernstein et al. | |
| 6,006,189 A | 12/1999 | Strawczynski et al. | |
| 6,009,467 A | 12/1999 | Ratcliff et al. | |
| 6,026,086 A | 2/2000 | Lancelot et al. | |
| 6,031,904 A | 2/2000 | An et al. | |
| 6,046,999 A | 4/2000 | Miki et al. | |
| 6,078,595 A | 6/2000 | Jones et al. | |
| 6,141,784 A | 10/2000 | Davis et al. | |
| 6,144,667 A | 11/2000 | Doshi et al. | |
| 6,147,988 A | 11/2000 | Bartholomew et al. | |
| 6,172,990 B1 | 1/2001 | Deb et al. | |
| 6,185,424 B1 | 2/2001 | Pon et al. | |
| 6,246,879 B1 * | 6/2001 | Segura et al. | 455/446 |
| 6,256,612 B1 | 7/2001 | Vo et al. | |
| 6,272,358 B1 | 8/2001 | Brent et al. | |
| 6,275,578 B1 | 8/2001 | De Trana et al. | |
| 6,295,302 B1 | 9/2001 | Hellwig et al. | |
| 6,298,055 B1 | 10/2001 | Wildfeuer | |
| 6,324,409 B1 | 11/2001 | Shaffer et al. | |
| 6,324,515 B1 | 11/2001 | Rabipour et al. | |
| 6,339,594 B1 | 1/2002 | Civanlar et al. | |
| 6,353,666 B1 | 3/2002 | Henderson et al. | |
| 6,389,016 B1 | 5/2002 | Sabaa et al. | |
| 6,392,993 B1 | 5/2002 | Hamilton et al. | |
| 6,414,964 B1 | 7/2002 | Holmquist et al. | |
| 6,424,637 B1 | 7/2002 | Pecen et al. | |
| 6,463,454 B1 * | 10/2002 | Lumelsky et al. | 718/105 |
| 6,549,945 B1 | 4/2003 | Sinibaldi et al. | |
| 6,553,423 B1 | 4/2003 | Chen | |
| 6,574,469 B1 | 6/2003 | Xiang et al. | |
| 6,600,738 B1 | 7/2003 | Alperovich et al. | |
| 6,614,781 B1 | 9/2003 | Elliott et al. | |
| 6,625,169 B1 | 9/2003 | Tofano | |
| 6,647,428 B1 | 11/2003 | Bannai et al. | |
| 6,658,064 B1 | 12/2003 | Rotola-Pukkila et al. | |
| 6,671,367 B1 | 12/2003 | Graf et al. | |
| 6,693,996 B2 | 2/2004 | Mansfield | |
| 6,721,269 B2 | 4/2004 | Cao et al. | |
| 6,731,627 B1 | 5/2004 | Gupta et al. | |
| 6,731,647 B2 | 5/2004 | Yao | |
| 6,765,931 B1 | 7/2004 | Rabenko et al. | |
| 6,778,517 B1 | 8/2004 | Lou et al. | |
| 6,781,983 B1 | 8/2004 | Armistead | |
| 6,795,437 B1 | 9/2004 | Räsänen et al. | |
| 6,842,461 B2 | 1/2005 | Harris | |
| 6,845,089 B1 | 1/2005 | Gu et al. | |
| 6,850,778 B1 | 2/2005 | Honkala et al. | |
| 6,850,883 B1 | 2/2005 | Kapanen et al. | |
| 6,865,220 B2 | 3/2005 | Abrishami | |
| 6,876,646 B1 | 4/2005 | Dore et al. | |
| 6,885,638 B2 | 4/2005 | Xu et al. | |
| 6,898,208 B1 | 5/2005 | Sligo et al. | |
| 6,944,166 B1 | 9/2005 | Perinpanathan et al. | |
| 6,956,816 B1 | 10/2005 | Alexander et al. | |
| 6,967,958 B2 | 11/2005 | Ono et al. | |
| 6,967,972 B1 | 11/2005 | Volftsun et al. | |
| 6,973,024 B1 | 12/2005 | Joseph et al. | |
| 6,983,163 B2 | 1/2006 | Sato et al. | |
| 6,985,530 B1 | 1/2006 | Zerbe | |
| 6,990,340 B2 | 1/2006 | Tamura et al. | |
| 6,999,459 B1 | 2/2006 | Callon et al. | |
| 7,006,489 B2 | 2/2006 | Li et al. | |
| 7,023,819 B2 | 4/2006 | Falsafi | |
| 7,054,318 B2 | 5/2006 | Eneroth et al. | |
| 7,054,320 B1 | 5/2006 | Lee et al. | |
| 7,058,085 B2 | 6/2006 | Earnshaw et al. | |
| 7,068,623 B1 | 6/2006 | Barany et al. | |
| 7,072,358 B2 | 7/2006 | Suvanen | |
| 7,082,143 B1 | 7/2006 | LeBlanc et al. | |
| 7,085,289 B2 | 8/2006 | Cromer et al. | |
| 7,089,011 B1 | 8/2006 | Mangal | |
| 7,095,733 B1 | 8/2006 | Yarlagadda et al. | |
| 7,103,021 B2 | 9/2006 | Jou | |
| 7,106,701 B2 | 9/2006 | Stümpert et al. | |
| 7,136,375 B1 | 11/2006 | Koistinen | |
| 7,162,024 B2 | 1/2007 | Wah et al. | |
| 7,180,892 B1 | 2/2007 | Tackin | |
| 7,181,209 B2 | 2/2007 | Tamura | |
| 7,203,226 B1 | 4/2007 | Rabipour et al. | |
| 7,233,595 B1 | 6/2007 | Hollis et al. | |
| 7,240,000 B2 | 7/2007 | Harada | |
| 7,245,589 B2 | 7/2007 | Neulist et al. | |
| 7,245,931 B2 | 7/2007 | Wang et al. | |
| 7,280,530 B2 | 10/2007 | Chang et al. | |
| 7,304,984 B2 | 12/2007 | Butler et al. | |
| 7,305,229 B2 | 12/2007 | Fox et al. | |
| 7,349,698 B2 | 3/2008 | Gallagher et al. | |
| 7,369,859 B2 | 5/2008 | Gallagher | |
| 7,400,881 B2 | 7/2008 | Kallio | |
| 7,471,655 B2 | 12/2008 | Gallagher et al. | |
| 7,483,374 B2 * | 1/2009 | Nilakantan et al. | 370/235 |
| 7,593,415 B2 | 9/2009 | Li et al. | |
| 7,639,601 B2 | 12/2009 | Rabipour et al. | |
| 7,729,346 B2 | 6/2010 | Lee et al. | |
| 7,792,096 B2 | 9/2010 | Doleh et al. | |
| 2001/0036158 A1 | 11/2001 | Hallenstal et al. | |
| 2001/0043577 A1 | 11/2001 | Barany et al. | |
| 2002/0001302 A1 | 1/2002 | Pickett | |
| 2002/0013147 A1 | 1/2002 | Fauconnier et al. | |
| 2002/0019881 A1 | 2/2002 | Bokhari et al. | |
| 2002/0027930 A1 | 3/2002 | Huh et al. | |
| 2002/0049860 A1 | 4/2002 | Koistinen | |
| 2002/0054571 A1 | 5/2002 | Falsafi | |
| 2002/0072364 A1 | 6/2002 | Tamura | |
| 2002/0106029 A1 | 8/2002 | Bunn et al. | |
| 2002/0118673 A1 | 8/2002 | Abrishami et al. | |
| 2003/0005106 A1 | 1/2003 | Isoda | |
| 2003/0032440 A1 | 2/2003 | Sato et al. | |
| 2003/0058822 A1 | 3/2003 | Jou | |
| 2003/0072273 A1 | 4/2003 | Aiello et al. | |
| 2003/0093509 A1 | 5/2003 | Li et al. | |
| 2003/0112796 A1 | 6/2003 | Kwan | |
| 2003/0117954 A1 * | 6/2003 | De Neve et al. | 370/230 |
| 2003/0123466 A1 | 7/2003 | Somekh et al. | |
| 2003/0123485 A1 | 7/2003 | Yi et al. | |
| 2003/0133423 A1 | 7/2003 | LaDue | |
| 2003/0134653 A1 | 7/2003 | Sarkkinen et al. | |
| 2003/0135376 A1 | 7/2003 | Harada | |
| 2003/0135784 A1 | 7/2003 | Yamaguchi et al. | |
| 2003/0189270 A1 | 10/2003 | Bei et al. | |
| 2003/0210659 A1 | 11/2003 | Chu et al. | |
| 2003/0233274 A1 | 12/2003 | Urken et al. | |
| 2004/0008652 A1 | 1/2004 | Tanzella et al. | |
| 2004/0010582 A1 | 1/2004 | Oliver | |
| 2004/0037224 A1 | 2/2004 | Choi et al. | |
| 2004/0037314 A1 | 2/2004 | Spear | |
| 2004/0047364 A1 | 3/2004 | Briggs et al. | |
| 2004/0066745 A1 | 4/2004 | Joe | |
| 2004/0073424 A1 | 4/2004 | Geppert et al. | |
| 2004/0090989 A1 | 5/2004 | Kobayashi | |
| 2004/0100914 A1 | 5/2004 | Hellwig et al. | |
| 2004/0101125 A1 | 5/2004 | Graf et al. | |
| 2004/0110539 A1 | 6/2004 | El-Maleh et al. | |
| 2004/0114588 A1 | 6/2004 | Bhaskaran | |
| 2004/0114626 A1 | 6/2004 | Cline et al. | |
| 2004/0114922 A1 | 6/2004 | Hardee | |
| 2004/0131025 A1 | 7/2004 | Dohler et al. | |
| 2004/0131051 A1 | 7/2004 | Rabipour et al. | |
| 2004/0133419 A1 | 7/2004 | El-Maleh et al. | |
| 2004/0136447 A1 | 7/2004 | LeBlanc | |
| 2004/0196867 A1 | 10/2004 | Ejzak et al. | |
| 2004/0208132 A1 | 10/2004 | Neulist et al. | |
| 2004/0252681 A1 | 12/2004 | Rabipour et al. | |
| 2004/0254786 A1 | 12/2004 | Kirla et al. | |
| 2004/0266426 A1 | 12/2004 | Marsh et al. | |

| | | | |
|---|---|---|---|
| 2004/0267897 A1 | 12/2004 | Hill et al. | |
| 2005/0007973 A1 | 1/2005 | Jang et al. | |
| 2005/0013281 A1 | 1/2005 | Milton et al. | |
| 2005/0013286 A1* | 1/2005 | Holland et al. | 370/351 |
| 2005/0027948 A1 | 2/2005 | Marlan et al. | |
| 2005/0048973 A1 | 3/2005 | Hou et al. | |
| 2005/0064907 A1 | 3/2005 | Nealon | |
| 2005/0073977 A1 | 4/2005 | Vanghi et al. | |
| 2005/0084094 A1 | 4/2005 | Gass et al. | |
| 2005/0085181 A1 | 4/2005 | Tao | |
| 2005/0099940 A1 | 5/2005 | Ohenoja et al. | |
| 2005/0105512 A1 | 5/2005 | Myhre et al. | |
| 2005/0074017 A1 | 7/2005 | Qian et al. | |
| 2005/0157823 A1 | 7/2005 | Sudhakar | |
| 2005/0172013 A1* | 8/2005 | Tan et al. | 709/220 |
| 2005/0185604 A1 | 8/2005 | Agarwal | |
| 2005/0195829 A1 | 9/2005 | Ward | |
| 2005/0232232 A1 | 10/2005 | Farber et al. | |
| 2005/0265279 A1 | 12/2005 | Markovic et al. | |
| 2005/0267746 A1 | 12/2005 | Jelinek et al. | |
| 2005/0286466 A1 | 12/2005 | Tagg et al. | |
| 2006/0046658 A1 | 3/2006 | Cruz et al. | |
| 2006/0050664 A1 | 3/2006 | Guey | |
| 2006/0062225 A1 | 3/2006 | Li et al. | |
| 2006/0067221 A1 | 3/2006 | Lee et al. | |
| 2006/0072555 A1 | 4/2006 | St. Hilaire et al. | |
| 2006/0092927 A1 | 5/2006 | Li et al. | |
| 2006/0154686 A1 | 7/2006 | Sarkkinen et al. | |
| 2006/0193289 A1 | 8/2006 | Ronneke et al. | |
| 2006/0198347 A1 | 9/2006 | Hurtta et al. | |
| 2006/0209873 A1 | 9/2006 | Knabchen et al. | |
| 2006/0229068 A1 | 10/2006 | Niemela et al. | |
| 2006/0268845 A1 | 11/2006 | He et al. | |
| 2006/0268888 A1 | 11/2006 | Liu et al. | |
| 2006/0286981 A1 | 12/2006 | Suumaki et al. | |
| 2006/0291454 A1 | 12/2006 | Ali | |
| 2006/0291483 A1 | 12/2006 | Sela | |
| 2007/0011727 A1 | 1/2007 | Mielenz et al. | |
| 2007/0041360 A1 | 2/2007 | Gallagher et al. | |
| 2007/0043558 A1 | 2/2007 | Schwarz et al. | |
| 2007/0104114 A1 | 5/2007 | Chu et al. | |
| 2007/0123196 A1 | 5/2007 | Tamura | |
| 2007/0127357 A1 | 6/2007 | Tamura | |
| 2007/0127436 A1 | 6/2007 | Karimi-Cherkandi et al. | |
| 2007/0135165 A1 | 6/2007 | Junghanns et al. | |
| 2007/0140214 A1 | 6/2007 | Zoltan | |
| 2007/0140293 A1 | 6/2007 | Agarwal et al. | |
| 2007/9171841 | 7/2007 | Witzel et al. | |
| 2007/0186002 A1 | 8/2007 | Campbell et al. | |
| 2007/0286082 A1 | 12/2007 | Hikspoors et al. | |
| 2008/0039087 A1 | 2/2008 | Gallagher et al. | |
| 2008/0102794 A1 | 5/2008 | Keevill et al. | |
| 2008/0123596 A1 | 5/2008 | Gallagher et al. | |
| 2008/0151845 A1 | 6/2008 | Jaakkola et al. | |
| 2008/0225765 A1 | 9/2008 | Marinier et al. | |
| 2008/0288245 A1 | 11/2008 | El-Maleh et al. | |
| 2008/0293416 A1 | 11/2008 | Yi et al. | |
| 2008/0316980 A1 | 12/2008 | Ahlen et al. | |
| 2010/0305943 A1 | 12/2010 | Witzel et al. | |

FOREIGN PATENT DOCUMENTS

| | | |
|---|---|---|
| CN | 1504039 A | 6/2004 |
| DE | 198 29 822 A1 | 1/2000 |
| EP | 0 907 280 A2 | 4/1999 |
| EP | 1 017 217 A2 | 7/2000 |
| EP | 1 076 466 A1 | 2/2001 |
| GB | 2363295 | 12/2001 |
| GB | 2 389 486 A | 12/2003 |
| WO | WO 99/29136 | 6/1999 |
| WO | WO 99/40569 | 8/1999 |
| WO | WO 00/51330 | 8/2000 |
| WO | WO 00/70885 | 11/2000 |
| WO | WO 01/26390 A1 | 4/2001 |
| WO | 02/052414 A1 | 7/2002 |
| WO | WO 03/043299 A1 | 5/2003 |
| WO | WO 03/103313 A1 | 12/2003 |
| WO | WO 2004/075582 A1 | 9/2004 |
| WO | WO 2005/050960 A1 | 6/2005 |
| WO | WO 2005/089055 | 9/2005 |
| WO | WO 2007/061548 A1 | 5/2007 |

OTHER PUBLICATIONS

Official Action for U.S. Appl. No. 11/589,435 (May 14, 2009).
"Rationale for Reverse Direction Capability List," Study Group 16, ITU—Telecommunication Standardization Sector, Nortel Networks (Nov. 2005).
"Digital Cellular Telecommunications System (Phase2+); Universal Mobile Telecommunications System (UMTS) Inband Tandem Free Operation (TFO) of Speec Codecs," (Dec. 2004), ETSI TS 128 062 v. 6.1.0, European Telecommunications Standards Institute (Dec. 2004).
"Series G: Transmission Systems and Media, Digital Systems and Networks," ITU-T, G.161, International Telecommunication Union (Jun. 2004).
Official Action for U.S. Appl. No. 11/589,435 (Aug. 10, 2010).
Notice of Panel Decision from Pre-Appeal Brief Review for U.S. Appl. No. 11/589,435 (May 25, 2010).
Final Official Action for U.S. Appl. No. 11/589,435 (Nov. 20, 2009).
Notice of Allowance and Fee(s) Due for U.S. Appl. No. 11/282,943 (May 6, 2010).
Interview Summary for U.S. Appl. No. 11/282,943 (Mar. 11, 2010).
Final Official Action for U.S. Appl. No. 11/282,943 (Jan. 22, 2010).
Interview Summary for U.S. Appl. No. 11/282,943 (Oct. 1, 2009).
Final Official Action for U.S. Appl. No. 11/282,943 (Jun. 22, 2009).
Interview Summary for U.S. Appl. No. 11/282,943 (Apr. 8, 2009).
Official Action for U.S. Appl. No. 11/282,943 (Oct. 28, 2008).
Notification of Transmittal of the International Search report and the Written Opinion of the International Searching Authority, or the Declaration for International Application No. PCT/US2006/041065 (Apr. 26, 2007).
Yoo et al., "A Media Stream Processing of VoIP Media Gateway," IEEE, p. 91-94 (Copyright 2003).
"Implementing Media Gateway Control Protocols," RADVision, pp. 1-16 (Jan. 27, 2002).
Notice of Allowance for U.S. Appl. No. 11/965,994 (Mar. 16, 2011).
Final Official Action for U.S. Appl. No. 10/782,754 (Feb. 15, 2011).
Notice of Allowance and Fee(s) Due for U.S. Appl. No. 11/589,435 (Jan. 11, 2011).
Interview Summary for U.S. Appl. No. 11/589,435 (Dec. 1, 2010).
Official Action for U.S. Appl. No. 10/782,754 (Aug. 3, 2010).
Official Action for U.S. Appl. No. 10/782,754 (Feb. 26, 2010).
Official Action for U.S. Appl. No. 10/782,754 (Sep. 4, 2009).
"3$^{rd}$ Generation Partnership Project; Technical Specification Group Services and System Aspects; Comfort Noise Aspects for Enhanced Full Rate (EFR) Speech Traffic Channels (Release 7)," 3GPP TS 46.062 V7.0.0 (Jun. 2007).
"3$^{rd}$ Generation Partnership Project; Technical Specification Group Services and System Aspects; Enhanced Full Rate (EFR) Speech Transcoding (Release 7)," 3GPP TS 46.060 V7.0.0 (Jun. 2007).
3$^{rd}$ Generation Partnership Project; Technical Specification Group Services and System Aspects; Inband Tandem Free Operation (TFO) of Speech Codecs; Service Description; Stage 3 (Release 7) 3GPP TS 28.062 V7.0.0, pp. 1-183 (Jun. 2007).
Series G: Transmission Systems and Media, Digital Systems and Networks; Digital Terminal Equipments—Coding of Analogue Signals by Methods Other than PCM; Coding of Speech at 8 kbit/s Using Conjugate—Structure lgebraic-Code-Excited Linear Prediction (CS-ACELP), pp. 1-146 (Jan. 2007).
"3$^{rd}$ Generation Partnership Project; Technical Specification Group Core Network and Terminals; Core Network Nb Interface user Plane Protocols (Release 5)," 3GPP TS 29.415 V5.2.0, pp. 1-14 (Dec. 2006).
"Series H: Audiovisual and Multimedia Systems; Infrastructure of Audiovisual Servies—Communication Procedures; Gateway Control Protocol: Version 3," ITU-T H.248.1, pp. 1-206 (Sep. 2005).
"3$^{rd}$ Generation Partnership Project; Technical Specification Group Services and System Aspects; Vocabulary for 3GPP Specification (Release 7)," 3GPP TR 21.905 V7.0.0, pp. 1-54 (Sep. 2005).

"Third Generation Partnership Project; Technical Specification Group Core Network and Terminals; Interworking Between the IP Multimedia (IM) Core Network (CN) Subsystem and Circuit Switched (CS) Networks (Release 6)" 3GPP TS 29.163, pp. 1-128 (Jun. 2005).

Agilent Technologies, "UMTS Network and Service Assurance," International Engineering Consortium, http://www.iec.org/online/tutorials/agilent_umts_network/topic03.html, pp. 1-4 (Copyright 2005).

"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).

3$^{rd}$ Generation Partnership Project; Technical Specification Group Services and System Aspects; Mandatory Speech Codec Speech Processing Functions; Adaptive Multi-Rate (AMR) Speech Codec Frame Structure (Release 6), 3GPP Ts 26.101 V6.0.0, pp. 1-20 (Sep. 2004).

International Search Report and Written Opinion of PCT/CA2004/0003000 mailed on Jul. 15, 2004.

R.L. Bunting (Editor), "Transcoder Free Operation," 3$^{rd}$ Generation Partnership, Version 1.0, Project 2 (Mar. 18, 2004).

Partial International Search Report, PCT/CA03/00972 (Nov. 3, 2003).

"3$^{rd}$ Generation Parnetship Project; Technical Specification Group Radio Access Network; UTRAN Iu Interface, User Plane Protocols (Release 4)," 3GPP TS 25.415 V4.7.0, pp. 1-62 (Dec. 2002).

Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).

ETSI: Digital Cellular Telecommunication System (Phase 2+) (GSM); Universal Mobile Telecommunications System (UMTS): Inband Tandem Free Operation (TFO) of Speech Codecs; Service Description; Stage 3 (3GPP TS 28.062 version 5.0.0 Release 5) ETSI TS 28 062 V5.0.0, xx,xx, Mar. 2002, pp. 14-19, 35-51, 56-59, 81-88, 164-168, XP002248624.

"3$^{rd}$ Generation Partnership Project; Technical Specification Group Core Network; Bearer-independent Circuit-Switched Core Network; Stage 2 (Release 4)," 3GPP TS 23.205 V4.4.0, pp. 1-183 (Mar. 2002).

"3$^{rd}$ Generation Partnership Project; Technical Specification Group Services and System Aspects; Inband Tandem Free Operation (TFO) of Speech Codecs; Service Description; Stage 3 (Release 5)," 3GPP TS 28.062 V5.0.0, pp. 1-175 (Mar. 2002).

"3$^{rd}$ Generation Partnership Project; Technical Specification Group Core Network; Out of Band Transcoder Control—Stage 2; (Release 4)," 3GPP TS 23.153 V4.4.0 Release 4, pp. 1-45 (Dec. 2001).

ETSI TS 128 062 V4.2.0 (Dec. 2001) Technical Specification; Digital Cellular Telecommunications System (Phase 2+) (GSM); Universal Mobile Telecommunications System (UMTS); Inband Tandem Free Operation (TFO) of Speech Codecs; Service Description; Stage 3 (3GPP TS 28.062 version 4.2.0 Release 4).

"3$^{rd}$ Generation Partnership Project; Technical Specification Group (TSG) RAN3; Transcoder Free Operation (Release 4)," 3GPP TR 25.953 V4.0.0, pp. 1-15 (Mar. 2001).

Third Generation Partnership Project, Meeting Report v3.0.0, 3GPP TSG-TrFO Workshop#04, pp. 1-18 (Oct. 17-19, 2000).

"Series G: Transmission Systems and Media, Digital Systems and Networks; Digital Transmission Systems—Terminal Equipments—Coding of Analogue Signals by Pulse Code Modulation," ITU-T G.711, Appendix II, pp. 1-18 (Feb. 2000).

ETSI: "Digital Cellular Telecommunications System (Phase2+): Inband Tandem Free Operation (TFO) of Speech Codecs; Service Description; Stage 3 (GSM 04.53 version 1.6.0)" GSM Global System for Mobile Telecommunications, Online, Oct. 1998, pp. 1-69, XP002283034.

"General Aspects of Digital Transmission Systems; Terminal Equipments; Pulse Code Modulation (PCM) of Voice Frequencies," ITU-T G.711, pp. 1-12 (Nov. 1988).

* cited by examiner

| VOICE ENHANCEMENT FUNCTION | END-POINT DEVICE | ORIGINATING NODE | INTER-MEDIATE NODE | TERMINATING NODE | END-POINT DEVICE |
|---|---|---|---|---|---|
| EC | MOBILE | DISABLE | DISABLE | DISABLE | MOBILE |
| | | DISABLE | DISABLE | DISABLE | IP PHONE |
| | | LOW PREFERENCE | MEDIUM | HIGH PREFERENCE | POTS |
| | IP PHONE | DISABLE | DISABLE | DISABLE | MOBILE |
| | | DISABLE | DISABLE | DISABLE | IP PHONE |
| | | LOW PREFERENCE | MEDIUM | HIGH PREFERENCE | POTS |
| | POTS | DISABLE | DISABLE | DISABLE | MOBILE |
| | | DISABLE | DISABLE | DISABLE | IP PHONE |
| | | LOW PREFERENCE | MEDIUM | HIGH PREFERENCE | POTS |
| AEC | MOBILE | HIGH PREFERENCE | MEDIUM | LOW PREFERENCE | MOBILE |
| | | HIGH PREFERENCE | MEDIUM | LOW PREFERENCE | IP PHONE |
| | | HIGH PREFERENCE | MEDIUM | LOW PREFERENCE | POTS |
| | IP PHONE | HIGH PREFERENCE | MEDIUM | LOW PREFERENCE | MOBILE |
| | | HIGH PREFERENCE | MEDIUM | LOW PREFERENCE | IP PHONE |
| | | HIGH PREFERENCE | MEDIUM | LOW PREFERENCE | POTS |
| | POTS | DISABLE | DISABLE | DISABLE | MOBILE |
| | | DISABLE | DISABLE | DISABLE | IP PHONE |
| | | DISABLE | DISABLE | DISABLE | POTS |

FIG. 4

| VOICE ENHANCEMENT FUNCTION | END-POINT DEVICE | ORIGINATING NODE | INTER-MEDIATE NODE | TERMINATING NODE | END-POINT DEVICE |
|---|---|---|---|---|---|
| NR | MOBILE | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | MEDIUM | LOW PREFERENCE | POTS |
| | IP PHONE | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | MEDIUM | LOW PREFERENCE | POTS |
| | POTS | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | MEDIUM | LOW PREFERENCE | POTS |
| ALC | MOBILE | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | NO PREFERENCE | LOW PREFERENCE | POTS |
| | IP PHONE | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | MEDIUM | LOW PREFERENCE | POTS |
| | POTS | NO PREFERENCE | NO PREFERENCE | NO PREFERENCE | MOBILE |
| | | NO PREFERENCE | NO PREFERENCE | NO PREFERENCE | IP PHONE |
| | | HIGH PREFERENCE | MEDIUM | LOW PREFERENCE | POTS |

FIG. 5

COMMUNICATING PROCESSING CAPABILITIES ALONG A COMMUNICATIONS PATH

This application claims the benefit of U.S. provisional application Ser. No. 60/554,605 filed Mar. 19, 2004, the disclosure of which is hereby incorporated by reference in its entirety.

FIELD OF THE INVENTION

The present invention relates to telecommunications, and in particular to exchanging and determining processing capabilities along the nodes of a communication path.

BACKGROUND OF THE INVENTION

Communication information, including data, audio, video, and voice information, may now travel in circuit-switched or packet-switched forms at any given time over disparate types of networks. The various nodes along a communication path may perform various types of processing functions in addition to routing or forwarding the information toward the next node. These features may include signal processing functions, such as controlling gain and providing noise reduction and echo cancellation. In many cases, the various nodes along a particular communication path may provide the same and/or different communication functions. For example, multiple nodes may provide echo cancellation and noise reduction, while other nodes may provide gain control. Further, other nodes may provide echo cancellation, noise reduction, and gain control. Accordingly, all of the communication nodes must be properly controlled and coordinated to provide the appropriate functions at the appropriate places and times. If provisioning of these functions is not properly implemented, the information being transferred along the path may be degraded. Such control and coordination is difficult to implement for relatively static conditions, and even more difficult to implement when the communication path dynamically changes, such as when a node fails and rerouting of the communication path is required. As such, there is a need for an effective and efficient technique to control and coordinate the provisioning of processing functions among the various nodes along a communication path.

SUMMARY OF THE INVENTION

The present invention provides a technique for determining which nodes are to provide various functions on traffic along a particular communication path. Generally, a communication path may include multiple nodes between which and through which traffic is routed. These nodes may include the communication terminals at either end of the communication path, as well as various types of routing nodes along the communication path. Each node will send to other nodes in the communication path information identifying the local functions it is capable of providing to the traffic carried in the communication path, and if available, remote functions capable of being provided to the traffic by other nodes in the communication path. Each node will receive from other nodes in the communication path information bearing on the remote functions.

In one embodiment, the information pertaining to the remote functions is received by the most proximate upstream and downstream remote nodes. Accordingly, each node in the communication path will successively receive information from an upstream or downstream node, add the local functions, and then forward a cumulative list of the downstream or upstream capabilities to the most proximate upstream or downstream nodes. As such, each node within the communication path can determine the various functions that are capable of being provided to the traffic in the communication path by the various nodes. Each node will then access selection criteria to determine whether any local functions should be applied to the traffic carried along the communication path.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 4 and 5 are tables providing exemplary rule sets for the communication environment of FIG. 3.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
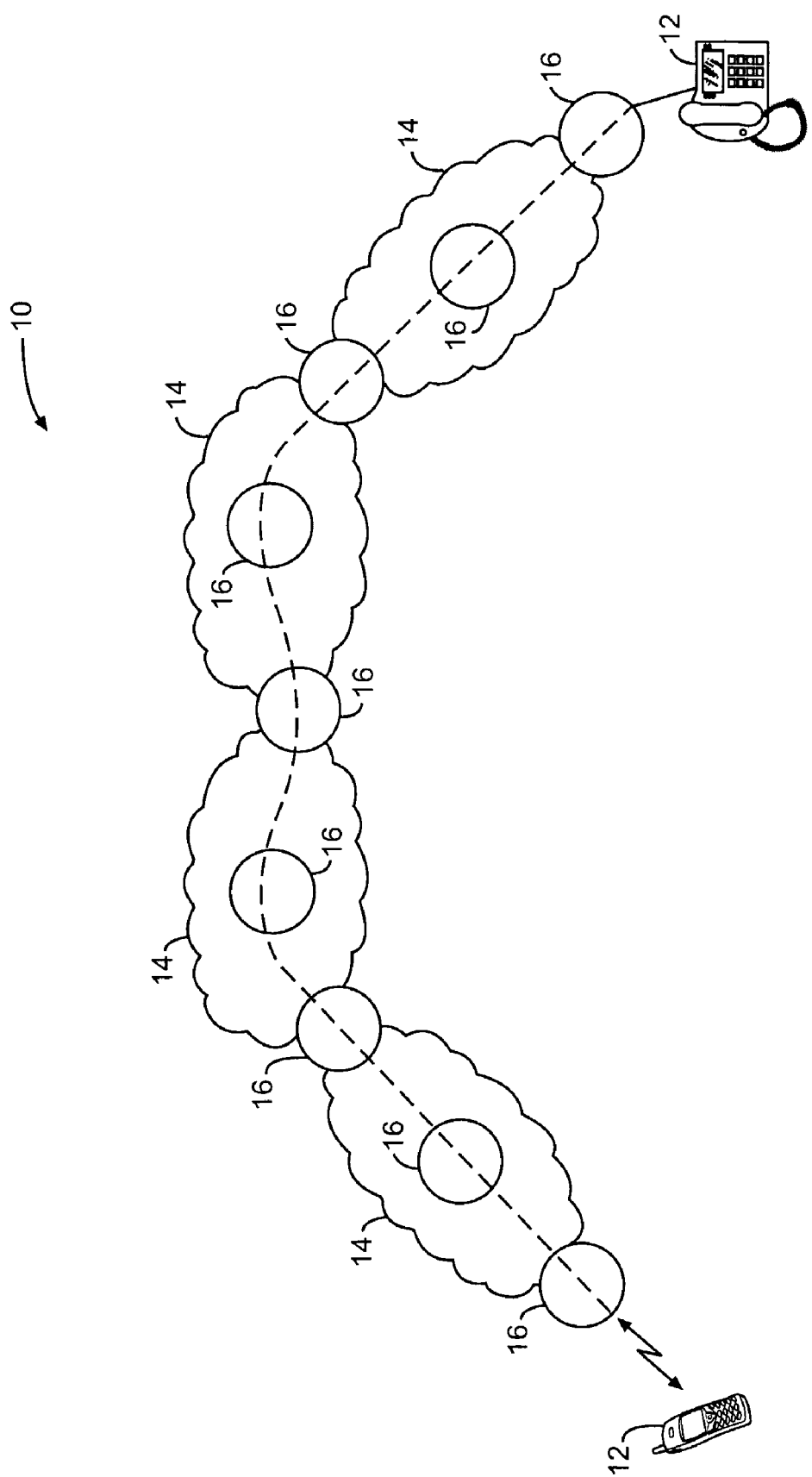
FIG. 1 is a block representation of a communication environment according to one embodiment of the present invention.

The present invention provides an efficient and effective technique for various nodes along a communication path in a communication environment to identify each other's capabilities and apply the appropriate functions to the information being carried along the communication path according to defined criteria. With reference to FIG. 1, a communication environment 10 is illustrated with numerous communication nodes. These nodes include communication terminals 12, which represent the endpoints of a communication path, which extends through various routing nodes 16 between and within numerous communication networks 14. The communication networks 14 may support various types of communications, wherein the routing nodes 16 between the communication networks 14 may act as media gateways, which facilitate interworking between disparate communication technologies. The routing nodes 16 within the communication networks 14 are used to route traffic along the communication path through a given communication network 14. The routing nodes 16 that interface through wired or wireless communications with the communication terminals 12 represent the relative access points for the associated communication network 14, and facilitate communications with the corresponding communication network 14 and the communication terminals 12. These access points may take the form of wireless local area network (WLAN) access points, wireless wide area networks (WWAN), Ethernet access points, cellular base stations, and the like, or any combination of such nodes. The communication terminals 12 are illustrated as being those supporting voice communications, but other information, including real-time and non-real-time data, may be communicated across the communication path and benefit from the present invention.

In essence, the present invention operates to provide end-to-end coordination of processing functions available at any of the nodes along the communication path, including the routing nodes 16 and the communication terminals 12. The coordination of processing functions along the communication path generally requires one or more of the following. The nodes are able to provide their capabilities to other nodes, as well as obtain the capability of other nodes along the communication path. When multiple nodes can support the same functions, the involved nodes may be operable to resolve the conflict and determine whether or not they should implement a certain function on the data being carried along the communication path. When network topologies change, the affected nodes may be operable to effectively update each other relative to these changes. Similarly, the nodes may be operable to control the relative provisioning of functions in a dynamic fashion as would be desired when network changes impact the communication path.

In general, the nodes along the communication path determine each other's relative capabilities to provide various functions, and individually determine whether to implement certain functions in light of a rule set that is available to all the nodes along the communication path. Again, these nodes may also include just the routing nodes 16 forming the communication path, or may include the communication terminals 12. The rule set will address the needs of a particular communication over a communication path, as well as conflicts amongst nodes, when these nodes can provide the same functionality. In operation, there is a set of predefined functions that may be provided by the various nodes along the communication path. A set of functions is defined and updated for a type of communication. For example, a set of voice signal processing functions is defined for voice communication applications of the protocol. A set of video signal processing functions is defined for video communication applications of the protocol. Each set can be defined and updated individually by the relevant standard or industry representing body.

Although each node may not be able to provide all of the functions, each node will be aware of all possible functions that may be provided by it or other nodes. In general, communications will travel in one direction along the communication path. If bidirectional communications are required, two communication paths may be initiated. Notably, the bidirectional communication paths may travel through the same nodes, although such is not required.

For each communication path that is supporting traffic in one direction, each node will provide a list of its features to at least the next upstream and downstream nodes along the communication path. When each node receives a list of features from an adjacent node, it will make note of the available features of the other nodes and forward this information to the respective upstream and downstream nodes. As such, each node along the communication path will ultimately recognize the capabilities of the other nodes along the communication path or at least the fact that other nodes along the communication path, either upstream or downstream, are capable of providing certain functions.

Figure 2:
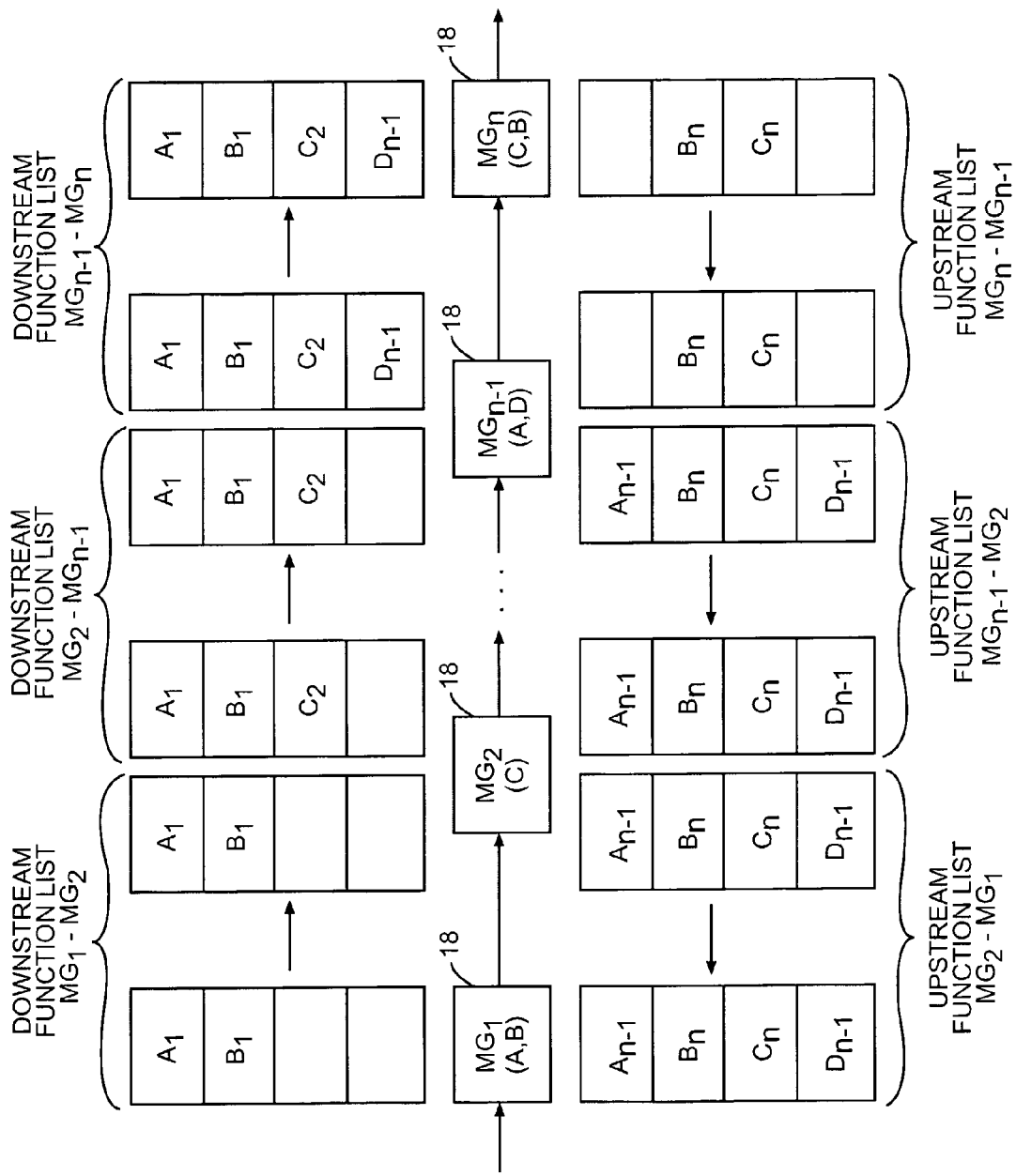
FIG. 2 is a block diagram illustrating how nodes along a communication path exchange function lists according to one embodiment of the present invention.

Operation of the present invention is better understood in association with the illustrative example of FIG. 2. Assume that a communication path extends between two communication terminals 12 (not shown in FIG. 2) through numerous media gateways (MGs) 18. For the purposes of example, the media gateways 18 are referenced as media gateway $MG_1$, media gateway $MG_2$, media gateway $MG_{n-1}$, and media gateway $MG_n$. Further assume that the communication path is established wherein traffic travels from media gateway $MG_1$ toward media gateway $MG_n$. Assume that media gateway $MG_1$ supports functions A and B, media gateway $MG_2$ supports function C, media gateway $MG_{n-1}$ supports functions A and D, and media gateway $MG_n$ supports functions C and B.

Each media gateway 18 will thus function as follows. Initially, media gateway $MG_1$ will create a downstream function list $MG_1$-$MG_2$ identifying the functions A and B, which are provided by media gateway $MG_1$. The downstream function list $MG_1$-$MG_2$ may identify the functions as being those provided by $MG_1$. As such, these functions are referenced as $A_1$ and $B_1$, respectively. The downstream function list $MG_1$-$MG_2$ is sent to media gateway $MG_2$, which is the next media gateway 18 downstream of media gateway $MG_1$ and along the communication path. Media gateway $MG_2$ will receive the downstream function list $MG_1$-$MG_2$ from media gateway $MG_1$ and create another downstream function list $MG_2$-$MG_{n-1}$, which identifies the functions A and B provided by media gateway $MG_1$, as well as function C, which is provided by media gateway $MG_2$. The downstream function list $MG_2$-$MG_{n-1}$ is then sent to the next downstream media gateway $MG_{n-1}$. Media gateway $MG_{n-1}$ will receive the downstream function list $MG_2$-$MG_{n-1}$ and determine that media gateway $MG_1$ can provide functions A and B, while media gateway $MG_2$ can provide function C. Next, media gateway $MG_{n-1}$ will create a downstream function list $MG_{n-1}$-$MG_n$, which will identify media gateway $MG_1$ as being able to provide functions A and B, media gateway $MG_2$ as being able to provide function C, and media gateway $MG_{n-1}$ as being able to provide function D and perhaps function A.

Accordingly, media gateway $MG_n$ will be operable to recognize that media gateway $MG_1$ is capable of providing functions A and B, media gateway $MG_2$ is capable of providing function C, and media gateway $MG_{n-1}$ is capable of providing at least function D, and perhaps function A. Thus, media gateway $MG_n$ is informed as to which functions can be provided upstream in the communication path, and will thus be operable to determine which functions it can provide to the data traveling along the communication path.

A similar operation is provided for upstream propagation. As such, media gateway $MG_n$ will create an upstream function list $MG_n$-$MG_{n-1}$ indicating that $MG_n$ can provide functions B and C. Media gateway $MG_{n-1}$ will receive the upstream function list $MG_n$-$MG_{n-1}$ and create an upstream function list $MG_{n-1}$-$MG_2$ indicating that media gateway $MG_n$ can provide functions B and C, while media gateway $MG_{n-1}$ can provide functions A and D. Media gateway $MG_2$ will receive the upstream function list $MG_{n-1}$-$MG_2$ and will create an upstream function list $MG_2$-$MG_1$ indicating that media gateway $MG_n$ can provide features C and B, media gateway $MG_{n-1}$ can provide functions A and D, and perhaps (although not shown) indicate that media gateway $MG_2$ can provide function C. As such, media gateway $MG_1$ upon receiving upstream function list MG₂-MG₁ will be able to determine the available functions and perhaps the media gateways 18 from which those functions are provided downstream along the communication path. At this point, each media gateway 18 along the communication path is aware of the available functions upstream and downstream along the communication path.

As illustrated, certain of the media gateways 18 can provide the same function. Generally, only one of the media gateways 18 will provide a given function at a given time. Accordingly, the media gateways 18 will access a common rule set, which will provide criteria for allowing each of the media gateways 18 to determine whether or not to implement a particular function in light of the capabilities of the other media gateways 18. For example, the criteria in the rule set may dictate that function A be provided by media gateway $MG_1$, and function B be provided by media gateway $MG_n$. Both media gateway $MG_1$ and media gateway $MG_n$ can access the rule set and independently determine whether or not to activate function B, and process the information carried along the communication path accordingly.

Notably, the functions provided by the various media gateways 18 and included in the function list may be associated with additional attributes that provide information bearing on the availability of the function, constraints associated with the function, characteristics of the function, and limitations of the functions. In particular, these attributes may relate to the relative capability of the node to implement a feature, or of the associated network to support the feature on a static or dynamic basis. For example, the attributes associated with a voice processing function may include jitter, delay, and bandwidth requirements or limitations. As such, the criteria in the rule set may help resolve conflicts of multiple media gateways 18 being able to provide a given function based on the attributes associated with providing the function at the different media gateways 18. Each of the media gateways 18 will essentially create a data structure, such as a database or table, identifying the functions it can provide as well as the functions that other media gateways 18 upstream or downstream along the communication path may provide. Again, these functions may be associated with attributes. The rule sets may be accessed from or provided by a centralized service node in a periodic or as-needed fashion. In one embodiment, the rule set may be a predefined rule set, wherein each node supporting the protocol has a copy.

Figure 3:
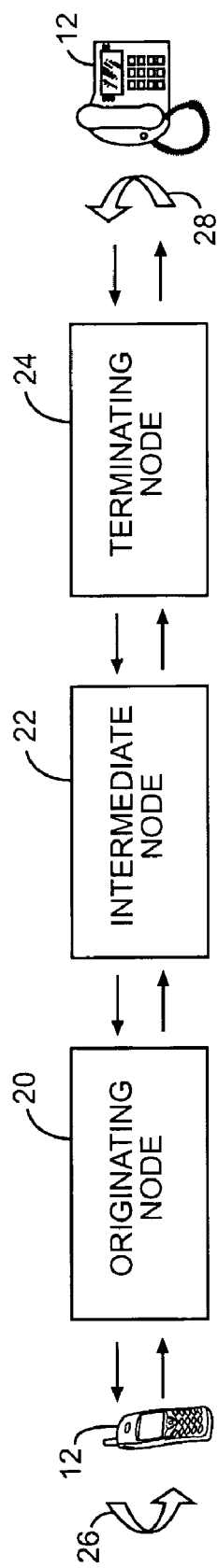
FIG. 3 is a block representation of a communication path established between two terminals according to one embodiment of the present invention.

Turning now to FIG. 3, a basic communication environment is illustrated wherein rule sets defined in the tables of FIGS. 4 and 5 are provided to allow the various communicating nodes to determine what functions should be implemented and where those functions should be implemented. Assume that communication terminals 12 will communicate with each other through three nodes: an originating node 20, an intermediate node 22, and a terminating node 24. Further assume that the curved arrows on either side of the diagram illustrate acoustic echoes 26 and electrically induced echoes 28. In this implementation, each of the originating node 20, intermediate node 22, and terminating node 24 is capable of supporting the electrical echo cancellation (EC), acoustic echo cancellation (AEC), noise reduction (NR), and automatic level control (ALC) for the selected communication path.

From the tables of FIGS. 4 and 5, each of these various functions EC, AEC, NR, and ALC are provided depending on the type of communication terminals 12. The tables set forth the criteria defining the preferred locations where a function should be activated when multiple nodes on the same communication path are capable of providing the same function.

As illustrated, the communication terminals 12 on either side of the communication network may take the form of a mobile terminal, such as a cellular telephone, an Internet Protocol (IP) telephone supporting packet-switched communications, or a Plain Old Telephone System (POTS) telephone. For each function in the table, each combination of the types of communication terminals 12 is provided. The criteria provides instructions for each of the originating node 20, intermediate node 22, and terminating node 24 to either disable or assign a low, medium, or high preference for implementing the function. In the echo cancellation (EC) example, and with continuing reference to FIGS. 3 and 4, when the left-most communication terminal 12 is a mobile terminal and the right-most communication terminal 12 is also a mobile terminal, echo cancellation is disabled in all three nodes 20, 22, 24. The same is true between a mobile terminal and an IP telephone as well as between two IP telephones. When communications are between a mobile terminal and a POTS telephone, the originating node 20 is assigned a low preference, the intermediate node 22 is assigned a medium preference, and the terminating node 24 is assigned a high preference for providing echo cancellation for the communication path. As such, the terminating node 24 will provide echo cancellation since it has the highest preference, and the originating node 20 and intermediate node 22 will not provide echo cancellation.

Notably, the tables of FIGS. 4 and 5 are merely for illustrative purposes according to the example wherein the routing nodes 16 are the primary nodes operating according to the present invention. As noted, the communication terminals 12 may act as nodes, and exchange function lists to determine the relative capabilities of the other nodes along the communication path and access a rule set to determine whether to activate a function that the communication terminal 12 can provide. In such an example, the tables of FIGS. 4 and 5 would be extended to provide instructional criteria for the communication terminals 12, and the illustrated criteria of FIGS. 4 and 5 may change depending on the capabilities of the communication terminals 12 and the desires of the network operators to process the traffic being communicated between the communication terminals 12.

Figure 6:
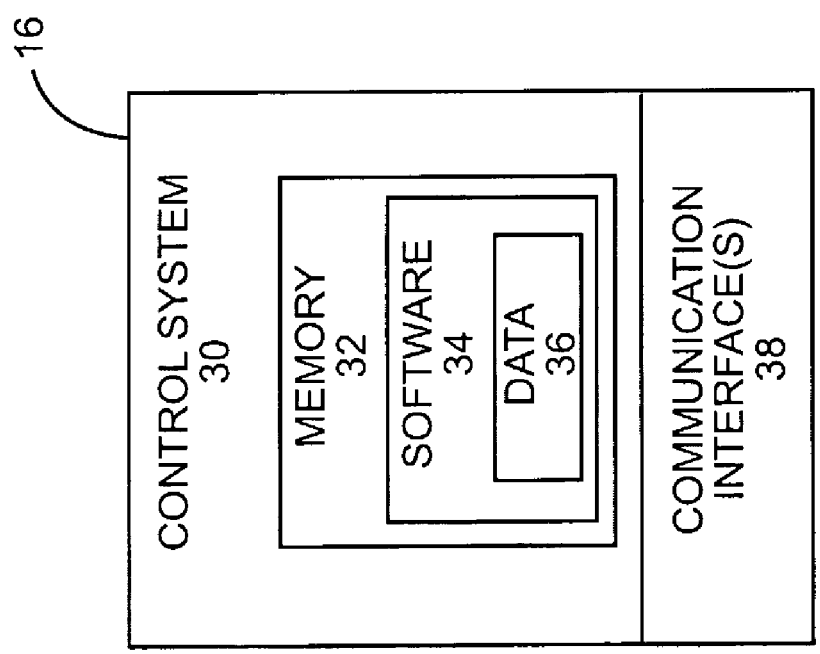
FIG. 6 is a block representation of a routing node according to one embodiment of the present invention.

With reference to FIG. 6, a block representation of a routing node 16 is illustrated according to one embodiment of the present invention. The routing node 16 may include a control system 30 associated with sufficient memory 32 for storing the requisite software 34 and data 36 to operate as described above. The control system 30 will be associated with one or more communication interfaces 38 to facilitate routing between other routing nodes 16 or between a routing node 16 and a communication terminal 12.

Figure 7:
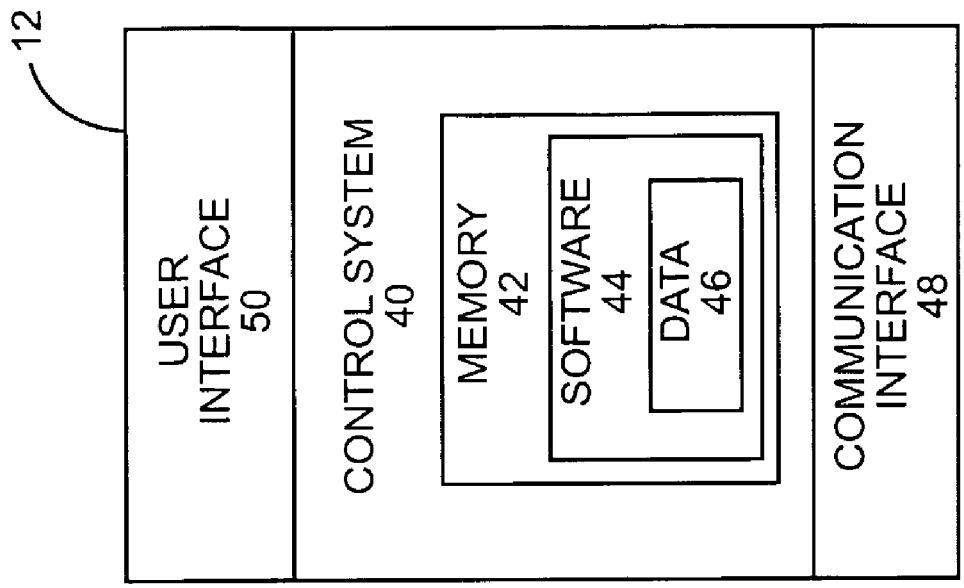
FIG. 7 is a block representation of a communication terminal according to one embodiment of the present invention.

With reference to FIG. 7, a communication terminal 12 is illustrated. The communication terminal 12 will include a control system 40 having sufficient memory 42 for the requisite software 44 and data 46 to operate as described above. The control system 40 will be associated with a communication interface 48 to interact with an appropriate access point, which may be a routing node 16, and a user interface 50 to facilitate interaction with a user.

The present invention is capable of controlling and allocating the activation of functions throughout the various routing nodes 16 and communication terminals 12 along a particular communication path. The functions may involve any type of operation on the information being routed along the communication path. These functions may include various types of signal processing, including audio signal processing, video signal processing, and the like, in addition to those functions described above. Such processing may include digital signal processing or other forms of data manipulation, as will be understood by those skilled in the art.

Those skilled in the art will recognize improvements and modifications to the preferred embodiments of the present invention. All such improvements and modifications are considered within the scope of the concepts disclosed herein and the claims that follow.

What is claimed is:

1. A method of determining functions to provide at a given node forming part of a communication path comprising:
   sending from the given node, information identifying:
      one or more local functions capable of being provided to traffic in the communication path by the given node; and
      if available, one or more remote functions capable of being provided to the traffic by other nodes forming part of the communication path;
   receiving information from at least one other node forming part of the communication path, the information identifying one or more remote functions; and
   determining whether any of the one or more local functions should be applied to the traffic based on criteria, which defines how the one or more local and remote functions are applied by the given node and other nodes and is available to the given node and other nodes,
   wherein the received information is received from at least one of the other nodes that is upstream of traffic flow, and at least one of the other nodes that is downstream of the traffic flow, and wherein the at least one of the other nodes that is upstream of the traffic flow is a most proximate node upstream of traffic flow, and the at least one of the other nodes that is downstream of the traffic flow is a most proximate node downstream of the traffic flow.

2. The method of claim 1 further comprising applying to the traffic any of the one or more local functions, which are determined to be applied to the traffic.

3. The method of claim 1 further comprising creating the information to identify the one or more remote functions provided by the one or more other nodes upstream and downstream of the given node and the one or more local functions.

4. The method of claim 1 wherein the criteria is further based on a location of one or more other nodes relative to the given node.

5. The method of claim 1 wherein the received information identifies one or more remote nodes associated with each of the one or more remote functions.

6. The method of claim 1 wherein at least one of the one or more local and remote functions is associated with an attribute, which is sent or received with the one or more local and remote functions, the criteria defining how at least one of the one or more local and remote functions are applied based on the attribute.

7. The method of claim 1 wherein the traffic is voice traffic.

8. The method of claim 1 wherein the given node is at least one of a terminal, an access point, an endpoint, a gateway, and a routing node.

9. The method of claim 1 wherein certain of the one or more local functions and certain of the one or more remote functions are identical, the criteria defining selection indicia determining which of one or more local and remote nodes is given priority.

10. A communication node forming part of a communication path comprising:
    a communication interface; and
    a control system associated with the communication interface and adapted to:
       send information identifying:
          one or more local functions capable of being provided to traffic in the communication path by the communication node; and
          if available, one or more remote functions capable of being provided to the traffic by other nodes forming part of the communication path;
       receive information from at least one other node forming part of the communication path, the information identifying one or more remote functions; and
       determine whether any of the one or more local functions should be applied to the traffic based on criteria, which defines how the one or more local and remote functions are applied by the communication node and the other nodes and is available to the communication node and the other nodes,
       wherein the received information is received from at least one of the other nodes that is upstream of traffic flow, and at least one of the other nodes that is downstream of the traffic flow, and wherein the at least one of the other nodes that is upstream of the traffic flow is a most proximate node upstream of traffic flow, and the at least one of the other nodes that is downstream of the traffic flow is a most proximate node downstream of the traffic flow.

11. The communication node of claim 10 wherein the control system is further adapted to apply to the traffic any of the one or more local functions, which are determined to be applied to the traffic.

12. The communication node of claim 10 further comprising creating the information to identify the one or more remote functions provided by one or more other nodes upstream and downstream of the communication node, and the one or more local functions.

13. The communication node of claim 10 wherein the criteria is further based on a location of one or more other nodes relative to the communication node.

14. The communication node of claim 10 wherein the received information identifies one or more other nodes associated with each of the one or more remote functions.

15. The communication node of claim 10 wherein at least one of the one or more local and remote functions is associated with an attribute, which is sent or received with the one or more local and remote functions, the criteria defining how at least one of the one or more local and remote functions are applied based on the attribute.

16. The communication node of claim 10 wherein the traffic is voice traffic.

17. The communication node of claim 10 wherein the communication node is at least one of a terminal, an access point, an endpoint, a gateway, and a routing node.

18. The communication node of claim 10 wherein certain of the one or more local functions and certain of the one or more remote functions are identical, the criteria defining selection indicia determining which of one or more other nodes and the communication node is given priority.

19. A method of determining functions to provide at a given node forming part of a communication path comprising:
    sending from the given node, information identifying:
       one or more local functions capable of being provided to traffic in the communication path by the given node; and
       if available, one or more remote functions capable of being provided to the traffic by other nodes forming part of the communication path;
    receiving information from at least one other node forming part of the communication path, the information identifying one or more remote functions; and determining whether any of the one or more local functions should be applied to the traffic based on criteria, which defines how the one or more local and remote functions are applied by the given node and other nodes and is available to the given node and other nodes, wherein the received information is received from at least one of the other nodes that is upstream of traffic flow, and at least one of the other nodes that is downstream of the traffic flow, and wherein the criteria is further based on a location of one or more other nodes relative to the given node.

20. A communication node forming part of a communication path comprising:

a communication interface; and a control system associated with the communication interface and adapted to:

send information identifying:

one or more local functions capable of being provided to traffic in the communication path by the communication node; and if available, one or more remote functions capable of being provided to the traffic by other nodes forming part of the communication path;

receive information from at least one other node forming part of the communication path, the information identifying one or more remote functions; and determine whether any of the one or more local functions should be applied to the traffic based on criteria, which defines how the one or more local and remote functions are applied by the communication node and the other nodes and is available to the communication node and the other nodes, wherein the received information is received from at least one of the other nodes that is upstream of traffic flow, and at least one of the other nodes that is downstream of the traffic flow, and wherein the criteria is further based on a location of one or more other nodes relative to the given node.

* * * * *